(12) United States Patent
Billon

(10) Patent No.: US 6,304,513 B1
(45) Date of Patent: Oct. 16, 2001

(54) METHOD FOR CORRECTING EFFECTS OF AN ANTENNA INTERFERING MOVEMENTS IN A SONAR WITH SYNTHETIC ANTENNA

(75) Inventor: Didier Billon, Brest (FR)

(73) Assignee: Thomson Marconi Sonar S.A.S., Sophia Antipolis (FR)

( * ) Notice: Subject to any disclaimer, the term of this patent is extended or adjusted under 35 U.S.C. 154(b) by 0 days.

(21) Appl. No.: 09/508,534

(22) PCT Filed: Oct. 6, 1998

(86) PCT No.: PCT/FR98/02130

§ 371 Date: Apr. 4, 2000

§ 102(e) Date: Apr. 4, 2000

(87) PCT Pub. No.: WO99/18452

PCT Pub. Date: Apr. 15, 1999

(30) Foreign Application Priority Data

Oct. 7, 1997 (FR) .................................................. 97 12483

(51) Int. Cl.[7] .................................................... G01S 15/89
(52) U.S. Cl. .................................................................. 367/88
(58) Field of Search ................................ 367/88, 12, 13

(56) References Cited

U.S. PATENT DOCUMENTS

| | | | |
|---|---|---|---|
| 4,183,024 | * | 1/1980 | Brooks . |
| 4,244,036 | * | 1/1981 | Raven .................................... 367/88 |
| 4,400,803 | * | 8/1983 | Spiess et al. ........................... 367/88 |
| 4,939,700 | * | 7/1990 | Breton .................................... 367/88 |
| 5,886,950 | | 3/1999 | Billon .................................... 367/88 |

FOREIGN PATENT DOCUMENTS

0282265-A * 9/1988 (EP) .
WO-9603662-A * 2/1996 (WO) .

OTHER PUBLICATIONS

Ollivier et al., "Side Scan Sonar Using Phased Arrays for High Resolution Imaging and Wide Swath Bathymetry", IEE Proceedings: Radar, Sonar & Navigation, vol. 143, No. 3, Jun. 1, 1996, pp. 163–168.*

* cited by examiner

Primary Examiner—Daniel T. Pihulic
(74) Attorney, Agent, or Firm—Oblon, Spivak, McClelland, Maier & Neustadt, P.C.

(57) ABSTRACT

The invention relates to synthetic antenna sonars.

It consists, in order to correct the effects of the spurious motions of the physical antenna (202) of this sonar, in simultaneously using an autofocussing by crosscorrelation of the recurrences, a measurement of the rotation of the physical antenna with a rate gyro, and a correction of this measurement of rotation on the basis of the measurement of the angle of elevation of the reception signal as obtained with the aid of an auxiliary antenna (203) perpendicular to the physical antenna. It makes it possible to obtain synthetic antenna sonars having excellent spatial resolution.

8 Claims, 2 Drawing Sheets

METHOD FOR CORRECTING EFFECTS OF AN ANTENNA INTERFERING MOVEMENTS IN A SONAR WITH SYNTHETIC ANTENNA

BACKGROUND OF THE INVENTION

1. Field of the Invention

The present invention relates to processes which make it possible to correct the effects of the spurious motions of the antenna in a synthetic antenna sonar, when the path of its physical antenna is not a perfect straight line.

2. Discussion of the Background

It is known that in a sonar the resolution is related to the dimensions of the antenna with respect to the wavelength used. This makes it possible in the case of a side-looking sonar intended for performing imaging of the bottom of the sea, in which the antenna located on the sides of the carrier vessel travels substantially along a straight line parallel to the path of the vessel and perpendicular to the direction of observation of the sonar, to use a so-called synthetic antenna system in which the signals received by the antenna at successive instants, and hence locations, are used to obtain a resolution substantially equivalent to that of a virtual antenna corresponding to the length traversed by the physical antenna during these various successive instants.

To form the various channels of such a sonar, the signals received are added together, using delays corresponding to the direction of the channel formed and to the various locations of the sensors of the antenna as a function of their position on the physical antenna and of the motion of the latter.

In the simple case where this motion is perfectly linear and constant, these delays are known. In reality the carrier vessel moves a great deal and in a very random manner. Hence, the position of the sensors during measurements is not known precisely.

The resolution $\delta y$ of conventional (non-synthetic) bottom-imaging side-looking sonars along the longitudinal axis parallel to the course is limited by the length L of their physical reception antenna. It is given by the formula:

$$\delta y = \frac{\lambda}{L} \cdot R \tag{1}$$

where $\lambda$ is the wavelength and R the range of the sonar.

The corresponding resolution of a synthetic sonar whose synthetic antenna is formed on the basis of N successive recurrences is given by the formula:

$$\delta y = \frac{\lambda}{2 \cdot (N-1) \cdot V \cdot T_r + L} \tag{2}$$

where V is the mean longitudinal speed during the N recurrences and $T_r$ the duration of a recurrence.

The main difficulty in applying the principle of the synthetic antenna to the sonar resides in the determination of the channel formation delays. Although these delays depend only on the distance and on the direction of the sighted point for a conventional antenna, those of a synthetic antenna depend on the motion of the carrier during its duration of formation. The larger this duration of formation, that is to say the larger the number of recurrences N, this going hand in hand with the search for better resolution, the more difficult it is to determine the delays.

To determine the delays in forming the channels of the synthetic antenna, one may seek to measure the motion of the physical antenna. The best precision in this measurement is achieved by means of an inertial instrumentation unit. However, it is known from an article by L. J. Cutrona "Comparison of sonar system performance achievable using synthetic-aperture sonar techniques with the performance achievable by more conventional means" — Journal of Acoustical Society of America, Vol. 58, No. 2, August 1975, that one is then confronted with a problem regarding the precision of the acceleration measurement.

The bias $\epsilon\gamma$ on the sighting axis must satisfy the following relation:

$$\epsilon\gamma < 8 \cdot \frac{\delta y^2 \cdot V^2}{R^2 \cdot \lambda} \tag{3}$$

We must then have $\epsilon\gamma < 2\ 10^{-4}\text{m/s}^2$ in order to obtain for example a resolution of 5 cm at a range of 350 m and at the speed of 8 knots with a sonar, were its frequency to be around 100 kHz. Such a value is compatible with the intrinsic precision of the best accelerometers, but not with a measurement on a craft whose orientation within the terrestrial gravity field is unknown. To obtain it in this case, it would be necessary to be able to measure the direction of the vertical to better than $2\ 10^{-5}$ rd, this being a precision which cannot realistically be obtained in such an on-board sonar system.

Various so-called autofocussing methods have been proposed to solve this difficulty, this terminology being employed since the coefficients are determined on the basis of the measurements of the signal. Among these latter are known in particular methods exploiting the crosscorrelation of the acoustic field on the antenna over two successive recurrences. When the longitudinal travel between two recurrences is smaller than half the length of the reception antenna, the field at the front end of the first recurrence is strongly correlated with the field at the back end. The length $L_c$ of the two correlated ends of the field of the antenna is then given by the formula:

$$L_c = L - 2 \cdot V \cdot T_r. \tag{4}$$

This correlation is exploited in order to estimate the longitudinal travel I, the difference $\tau$ in the outward and return propagation times of the sonar pulse for one and the same point of reflection on the bottom, and the rotation $\beta$ of the sighting direction, between the two recurrences. An example of such a method is described in American U.S. Pat. No. 4,244,036 (Raven).

FIG. 1 makes it possible to define the notation for the parameters used. Represented therein are two successive positions 101 and 102 of the physical antenna corresponding to two recurrences n–1 and n. The axis 103 is the mean longitudinal direction, that is to say the direction parallel to the antenna, for the 2 recurrences. It is not in general identical to the direction of travel of the vessel, on account of drift.

Since the difference in the propagation times $\tau$ relates to two reception points located at the centre of the two correlated ends 104 and 105, the estimation errors for the three parameters are independent. The three parameters $I_n$, $\tau_n$ and $\beta_n$ being estimated on the basis of the recurrences n–1 and n, and $\theta_n$ being the sighting direction at the centre of the reception antenna of the physical antenna at recurrence n (position 102) for a fixed point a distance R away, one obtains the channel formation delay $\tau_{S,n}(\xi)$ for the synthetic antenna for the signal received at recurrence n at a point with abscissa $\xi$ in the reference frame of the physical antenna, by means of the recurrence relations:

$$\theta_n = \theta_{n-1} - \beta_n - \frac{1_n}{R} \quad (5)$$

$$\tau_{S,n}(\xi) = \tau_{S,n-1}(\xi+) + \tau_n - \tau_{P,n}(\xi-) + \tau_{P,n}(\xi) \quad (6)$$

where $\theta_{P,n}(\xi)$ is the channel formation delay for the physical antenna at the point with abscissa $\xi$ and where $\xi_-$ and $\xi_+$ may depend on n, since, the speed not generally being constant, the length of the two correlated ends can vary.

The direction setting for a channel is defined in the reference frame of the physical antenna at a given recurrence, for example the central recurrence of the synthetic antenna. For this reference recurrence, the channel formation delays for the synthetic antenna are those for the physical antenna. By means of the above recursive relations, the channel formation delays for all the other sonar recurrences which are used to build the synthetic antenna are then estimated gradually. The impact of the error in estimating l generally negligible compared with those of the errors in estimating the other two parameters. Each new insertion of the recursive estimation relations generates an error in the channel formation delays, which is added to the errors of the previous iterations. Thus, the error in estimating the channel formation delay at the point with abscissa $\xi_-$ after a given number of iterations is the sum of as many independent errors, each itself being the sum of two independent components:

the error in estimating $\tau_n$, the error in estimating $\tau_{P,n}(\xi_-) - \tau_{P,n}(\xi_+)$ caused by the error in $\beta_n$.

Calling $\phi_\tau$ and $\phi_\beta$ the standard deviations of the corresponding phase errors, the latter are obtained with the aid of the following approximate expressions:

$$\phi_\tau = \sqrt{\frac{1}{K}\left(\frac{1}{\rho} - \frac{1}{2\rho^2}\right)} \quad (8)$$

$$\phi_\beta = \frac{2VT_r}{L_c}\sqrt{12\left(\frac{1}{\rho} - \frac{1}{2\rho^2}\right)} \quad (9)$$

where K is the number of independent samples of the signals of the antenna of one and the same recurrence involved in the autofocussing and $\rho$ is equal to $\mu/(1-\mu)$, $\mu$ being the crosscorrelation coefficient.

Since in practice one seeks to maximize the speed of travel of the carrier vessel, the length of the correlated ends $L_c$ must be as small as possible and the inter-recurrence travel VTr somewhat less than the upper limit value L/2 imposed by the spatial sampling constraint of the synthetic antenna. Under these conditions, it follows from the expressions for $\phi_\tau$ and $\phi_\beta$ that it is the error in estimating the rotation which is by far the most critical.

The impact of this error on the directivity gain g of the channel formed with these estimated delays is given by the relation:

$$E(g^2) \approx 1 - \frac{N^2-1}{N} \cdot \frac{\phi^2}{6} \quad (10)$$

where $\phi^2 = \phi_\tau^2 + \phi_\beta^2$

Referring to the practical example described earlier, the length of the physical antenna must be around 4 m and the number of recurrences constituting the synthetic antenna around 30. In order for the loss in directivity gain to be less than the commonly sought value of 1 dB, it is necessary for $\phi$ to be less than 0.2 rd. If $\phi_\tau$ is neglected, the relation between $\phi$ and the error $\sigma$ in measuring the rotation is given by the formula:

$$\phi = 2\pi\sigma \cdot \frac{L - L_c}{\lambda} \quad (11)$$

For a range of 350 m, the duration $T_r$ of the recurrence is 470 ms. Relation (4) then gives $l_c$=0.3 m for L=4 m and V=8 knots. Hence, in the example described, the standard deviation in the estimation of the rotation, carried out on the basis of the antenna signals at the two ends of length $L_c$, must be less than $10^{-4}$ rd.

The angular resolution $\lambda/L_c$ of each end is equal to 5 $10^{-2}$ rd, i.e. 500 times the precision required in estimating the rotation. It is therefore unrealistic to hope to achieve such precision by estimation on the basis of the antenna signals.

SUMMARY OF THE INVENTION

To overcome these difficulties, the invention proposes a process for correcting the effects of the spurious motions of the antenna in a synthetic antenna sonar, in which a synthetic antenna is formed over N recurrences of the sonar and the variations in the motion of the physical antenna are corrected by performing an autofocussing by crosscorrelation of the successive recurrences, essentially characterized in that in order to correct these variations, use is made moreover of the measurement of the rotations of the antenna obtained with at least one rate gyro, and that the angle of elevation of the reception signal is measured with an auxiliary antenna perpendicular to the said physical antenna so as to increase the precision of measurement of the said rotation on the basis of the rate gyro measurements.

According to another characteristic, the physical antenna is carried by an underwater vehicle whose hull is of substantially circular section and the auxiliary antenna is curved so as to match the shape of this hull.

According to another characteristic, the auxiliary antenna is reduced to two extreme transducers and one intermediate transducer.

According to another characteristic, the intermediate transducer is one of the transducers of the physical antenna.

According to another characteristic, the sonar is of the type with interferometric synthetic antenna using two superposed physical antennas and the signals received by these two physical antennas are used to measure the angle of elevation.

BRIEF DESCRIPTION OF THE DRAWINGS

Other features and advantages of the invention will become clearly apparent in the following description, presented by way of non-limiting example in conjunction with the appended figures which represent.

DESCRIPTION OF THE PREFERRED EMBODIMENTS

The invention therefore proposes that the rotations of the antenna be measured by means of rate gyros. The order of magnitude of the sought-after precision in measuring speed of rotation is given approximately by the ratio of the desired value of $\sigma$ to the duration of the recurrence. In the example described, this ratio is equal to 2 $10^{-4}$ rd/s. This value is manifestly several orders of magnitude above the precision of the existing rate gyros built into commercially available inertial instrumentation of suitable cost and size for such an application.

However, the measurement is performed with respect to a reference frame tied to the platform, whereas one needs only the value of the rotation in the sighting plane determined by the mean position of the antenna at the two instants of reception and the sighted point.

The invention therefore proposes that the desired precision be obtained by associating with the main antenna a vertical auxiliary array antenna, preferably used only in reception with transmission common to both antennas, so as to measure the elevational slant of the sighting plane, and to project the rotation measurement obtained by the rate gyros onto this plane, the parameters 1 and τ being estimated by autofocussing as previously.

Calling α the component of the rotation vector perpendicular to the antenna and parallel to the sighting plane, which corresponds substantially to the pitch at the limit of range when the beam grazes the bottom of the sea, $\epsilon_\psi$ the error in measuring the angle of elevation and $\epsilon_\theta$ the error in the rotation of the antenna in the sighting plane, induced by the error in measuring the elevation, one obtains the following relation:

$$\epsilon_\theta = \alpha \cdot \epsilon_\psi \qquad (12)$$

For a value of α=1° for example, the sought-after precision in θ in the example described requires a precision in the value of ψ of the order of 6 mrd. It is known that a precision in the angle of reception at least 10 times greater than the angular resolution afforded by the antenna can easily be obtained using known deviation-measurement processing procedures.

To obtain the required precision in the example described, one is then led to use an auxiliary antenna whose vertical extent is of the order of 20 wavelengths, i.e. 30 cm in this example. Such a dimension does not pose any significant layout problem in the platforms commonly used to carry this type of sonar.

Figure 1:
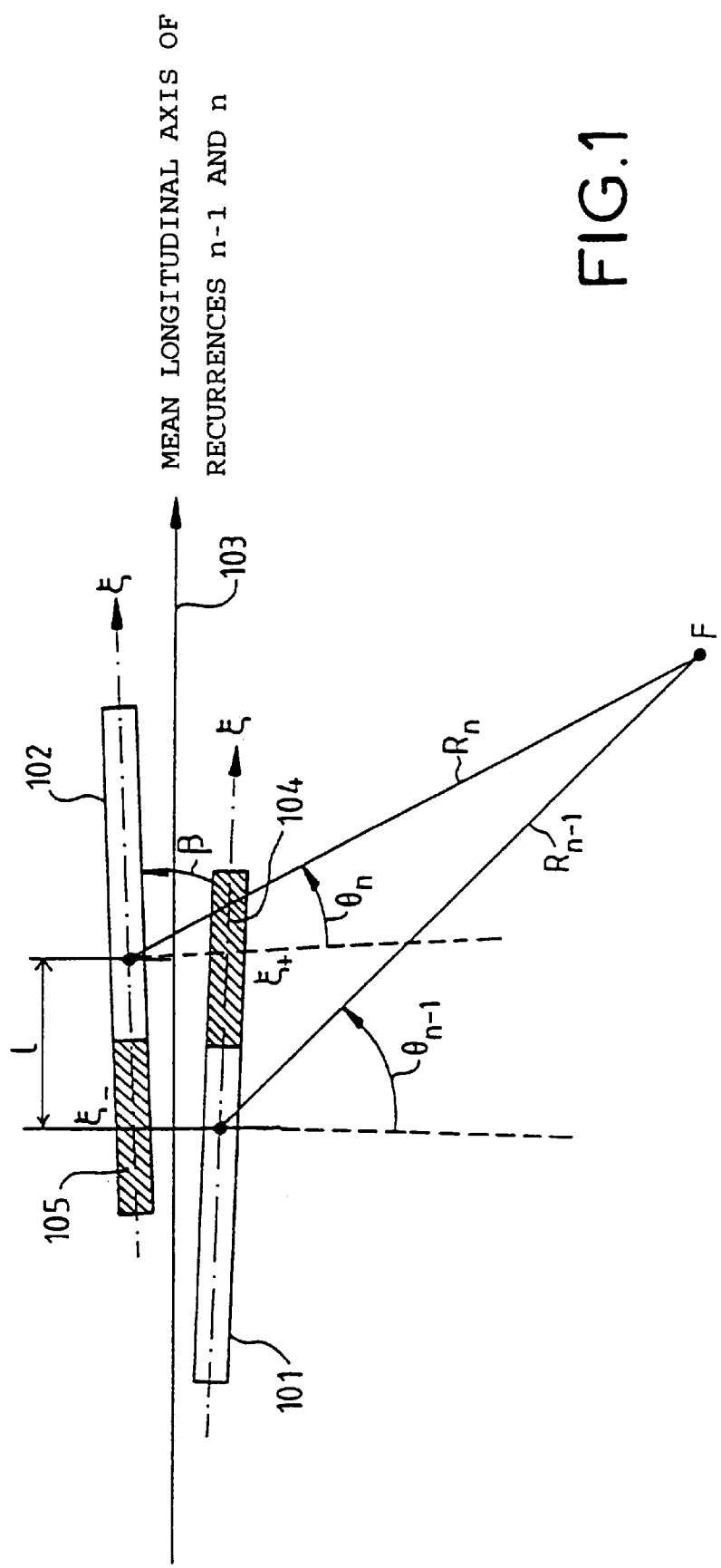
FIG. 1, a diagrammatic view of a physical antenna in two positions corresponding to two successive recurrences.
Figure 2:
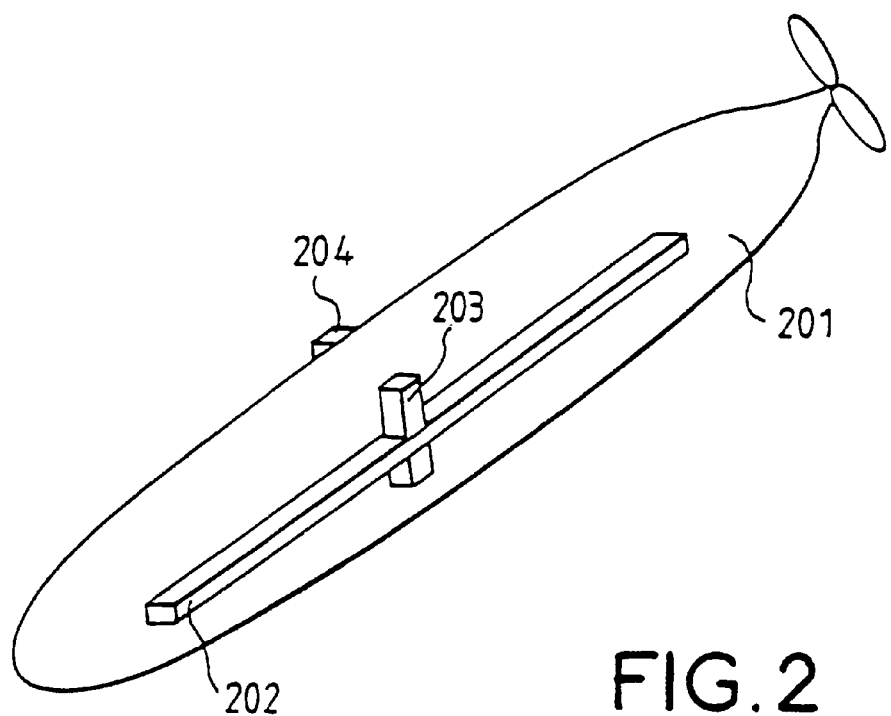
FIG. 2, a perspective view of an underwater vehicle fitted with a sonar according to the invention.

Represented in FIG. 2 is an exemplary embodiment of a sonar according to the invention, carried by an underwater vehicle which can either be remotely controlled or directed by a self-homing head. It comprises in an internal manner at least one rate gyro making it possible to measure its rotation in the horizontal plane. Preferably, this rate gyro will form part of an inertial instrumentation unit.

On its body 201 this vehicle comprises side-looking looking longitudinal antennas, only the port antenna 202 being visible in the figure, the starboard antenna being located on the face which cannot be seen in the figure. These side-looking antennas are of the usual type for synthetic antenna sonars. According to the invention, two auxiliary vertical antennas 203 and 204 which make it possible to measure the angle of elevation of the signal backscattered by the bottom are added on these port and starboard sides of the body 201. In this exemplary embodiment, these antennas are linear, but they could be curved so as to match the cylindrical hull 201. These vertical antennas are formed of a stack of sensors whose width, which determines the azimuthal aperture of the reception lobe of the antenna, is preferably such that this aperture is substantially equal to the transmission-end azimuthal aperture of the side-looking sonar.

In the exemplary embodiment described, this aperture is of the order of 10°, this corresponding to a width of the sensors of the order of 8 cm, for a transmitted frequency of 100 kHz.

The total height of the vertical antenna then being appreciably greater than the height of the individual sensors of the horizontal antenna 202, the signal/noise ratio at the channel output on this vertical antenna is then appreciably greater than that obtained on the horizontal antenna (by virtue of the antenna gain).

In practice, sensors whose height is substantially equal to the wavelength used are employed for this horizontal antenna, so as to be able to cover a sufficiently wide sector in terms of elevation.

Under these conditions, the height of the sensors of the vertical antenna is substantially identical to that of the sensors of the horizontal antenna, since it is necessary to cover the same sector. Some twenty sensors are then used to constitute this vertical antenna. Therefore, the signal/noise ratio of the vertical antenna at the channel output is around 13 decibels greater than the same signal/noise ratio for the horizontal antenna.

Figure 3:
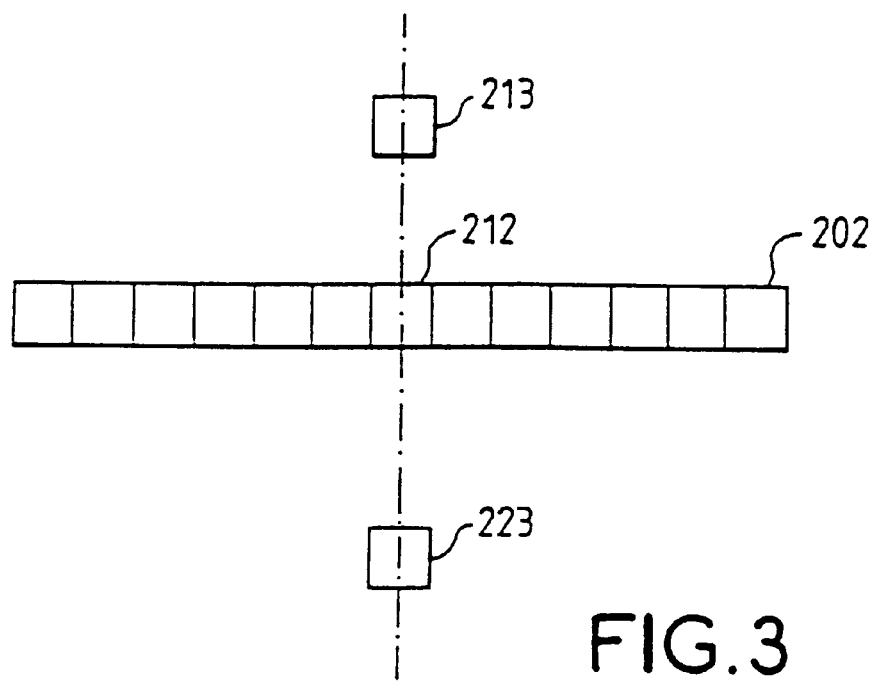
FIG. 3, a diagrammatic view of the antennas of such a sonar according to a variant embodiment.

This result could be regarded as entirely excessive. The invention therefore proposes a second embodiment, represented diagrammatically in FIG. 3, in which the hardware used is drastically simplified whilst retaining perfectly satisfactory performance.

To do this, the auxiliary vertical antenna is made using only three sensors 212, 213 and 223. The sensors 213 and 223 are in fact the extreme sensors which would have been used in an antenna of the type of the antenna 203 in FIG. 2, and the sensor 212 is the central sensor of the antenna 202, which is used equally in this antenna 202 and in the vertical auxiliary antenna. The additional hardware necessary or the invention is therefore reduced to the two sensors 213 and 223.

The antenna thus obtained is sparse and is rather more akin to a straightforward direction finder. It is then known that in such an antenna one obtains angular ambiguities which must be eliminated.

To do this, the two sensors 213 and 223 will advantageously be placed slightly different distances from the central sensor, thereby making it possible to achieve this elimination of ambiguity in a known manner. A simplified auxiliary antenna of this kind nevertheless retains a gain in signal/noise ratio relative to that of the horizontal antenna of 5 decibels, which is again entirely satisfactory.

The invention also extends to the case of interferometric synthetic antennas, such as for example those described in U.S. Pat. No. 4,400,803 granted on Aug. 23, 1983 in the name of Fred N. SPIESS. In the embodiment described in this patent, use is made of a dual synthetic antenna formed from two superposed physical antennas. In such a case, the angle of elevation of the sighting plane is measured on the basis of the signals from the two identical superposed physical antennas and the angle of elevation thus measured is used to perform the hybrid autofocussing according to the invention as described earlier.

In conclusion, the bottom-imaging sonar according to the invention and described in the present patent application achieves the association of a synthetic antenna with a device for autofocussing by crosscorrelation of recurrences, a measurement of rotation of the antenna between the various successive recurrences used to synthesize the antenna by means of an inertial instrumentation unit, and a measurement of the angle of elevation of the signal backscattered by the bottom by means of an auxiliary array antenna having vertical directivity. The latter measurement makes it possible Lo obtain sufficient precision in the measurement of the rotations to be able to perform the autofocussing with a much better resolution than that obtained hitherto in existing sonars.

What is claimed is:

1. Process for correcting the effects of the spurious motions of the antenna in a synthetic antenna sonar, in which a synthetic antenna is formed over N recurrences of the sonar and the variations in the motion of the physical antenna are corrected by performing an autofocussing by crosscorrelation of the successive recurrences, characterized in that in order to correct these variations, use is made moreover of the measurement of the rotations of the antenna obtained with at least one rate gyro, and that the angle of elevation of the reception signal is measured with an auxiliary antenna perpendicular to the said physical antenna so as to increase the precision of measurement of the said rotation on the basis of the rate gyro measurements.

2. Process according to claim 1, characterized in that the physical antenna is carried by an underwater vehicle whose hull is of substantially circular section and in that the auxiliary antenna is curved so as to match the shape of this hull.

3. Process according to claim 1, characterized in that the auxiliary antenna is reduced to two extreme transducers and one intermediate transducer.

4. Process according to claim 3, characterized in that the intermediate transducer is one of the transducers of the physical antenna.

5. Process according to claim 1, characterized in that the sonar is of the type with interferometric synthetic antenna using two superposed physical antennas and in that the signals received by these two physical antennas are used to measure the angle of elevation.

6. Process according to claim 2, characterized in that the sonar is of the type with interferometric synthetic antenna using two superposed physical antennas and in that the signals received by these two physical antennas are used to measure the angle of elevation.

7. Process according to claim 3, characterized in that the sonar is of the type with interferometric synthetic antenna using two superposed physical antennas and in that the signals received by these two physical antennas are used to measure the angle of elevation.

8. Process according to claim 4, characterized in that the sonar is of the type with interferometric synthetic antenna using two superposed physical antennas and in that the signals received by these two physical antennas are used to measure the angle of elevation.

* * * * *